United States Patent [19]
Korotky et al.

[11] Patent Number: 4,787,689
[45] Date of Patent: Nov. 29, 1988

[54] DEVICES HAVING LOW LOSS CURVED OR TAPERED OPTICAL WAVEGUIDES

[75] Inventors: Steven K. Korotky, Toms River; Enrique A. J. Marcatili, Rumson, both of N.J.

[73] Assignee: American Telephone and Telegraph Company, AT&T Bell Laboratories, Murray Hill, N.J.

[21] Appl. No.: 730,672

[22] Filed: May 3, 1985

[51] Int. Cl.$^4$ ............................................. G02B 6/10
[52] U.S. Cl. ............................ 350/96.12; 350/96.14
[58] Field of Search .............. 350/96.11, 96.12, 96.13, 350/96.15, 96.30

[56] References Cited

U.S. PATENT DOCUMENTS 4,557,742 12/1985 Thigpen ........................ 350/963 X

OTHER PUBLICATIONS

Neumann, "Dielectric Optical Waveguide TiHs with Reduced Losses", European Conference on Optical Comm., Sep. 1981.
*Applied Optics*, 13, Mar. 1974, pp. 642–647.
*Applied Optics*, 16, Mar. 1977, pp. 711–716.
*Applied Optics*, 17, Mar. 1978, pp. 763–768.
*IEEE Journal of Quantum Electronics*, QE-11, Feb. 1975, pp. 75–83.
*IEEE Journal of Quantum Electronics*, QE-18, Oct. 1982, pp. 1802–1806.

*Primary Examiner*—Eugene R. Laroche
*Assistant Examiner*—James C. Lee
*Attorney, Agent, or Firm*—Richard D. Laumann

[57] ABSTRACT

An optical device comprising an optical waveguide having a varying refractive index has low radiation loss. The waveguide may be either curved or tapered.

15 Claims, 2 Drawing Sheets

DEVICES HAVING LOW LOSS CURVED OR TAPERED OPTICAL WAVEGUIDES

TECHNICAL FIELD

This invention relates generally to the field of optical waveguides and particularly to devices using optical waveguides having a varying refractive index and low loss.

BACKGROUND OF THE INVENTION

An optical waveguide typically has a region of high refractive index surrounded by a region of low refractive index. The high-low refractive index profile provides the required light guiding effect as the optical radiation is reflected back to the high refractive index region at the interface of the two regions.

Optical waveguides presently find many applications in technology and will undoubtedly be even more widely used in the future. For example, optical waveguides are commonly used to guide light between two optical devices. The waveguide can be an optical fiber guiding light between a light source and a photodetector. Optical fibers typically have a high-index cylindrical core surrounded by a low-index clad. Waveguides are also used in many types of devices including electrooptic devices using $LiNbO_3$ as well as semiconductor lasers. Waveguides may also be used to connect different optical devices.

For many applications, the waveguides must either be curved or have varying transverse dimensions, i.e., they are tapered. These characteristics are often required, e.g., to connect devices having different dimensions or to switch the optical signals from one waveguide to another waveguide. However, practical implementation of low-loss waveguides having these characteristics is not easy. For example, curved waveguides may have extremely high radiation losses unless very large radii of curvature are used. The currently used optical waveguides are formed by indiffusing Ti into $LiNbO_3$, and they may be bent only very slightly to avoid prohibitively high radiation losses. A typical radius of curvature is about 2 cm at a wavelength of approximately 1.3 $\mu$m. Such a relatively large radius of curvature is undesirable for several reasons. For example, optical circuits using such waveguides tend to be long and skinny thereby making an inefficient use of the crystal surface as only relatively thin strips are effectively utilized. Additionally, there are some devices such as, e.g., ring filters and ring lasers which require optical feedback and are not currently feasible because of the large radius of curvature required.

A simple physical argument may be used to show that the conventional curved dielectric waveguide should be lossy because of radiation. Assume that the waveguide is a curved slab having a constant thickness and curvature with a uniform refractive index inside the slab which is larger than the uniform refractive index outside the slab. The phase fronts of the radiation in the waveguide should move at the same speed, that is, the phase fronts should be rotating planes. It will be readily appreciated that the phase fronts have zero speed at zero radius and approach infinite velocity as the radius becomes large. However, since the velocity of the energy cannot exceed the speed of light, radiation from the waveguide must necessarily occur. Therefore, this curved waveguide is lossy.

Another type of problem also leading to losses often occurs when a waveguide is used to connect devices of different physical dimensions. This problem may arise, e.g., when the waveguide is used to connect a semiconductor laser to an optical fiber or one optical fiber to another when the the two have significantly different physical dimensions. The waveguide is typically tapered, i.e., it has a varying transverse dimension, so that the dimensions of the waveguide match those of the devices at the device-waveguide interfaces.

The fact that such a waveguide may be lossy is easily understood from the following physical argument. Assume that the waveguide is a linearly tapered slab with a uniform refractive index outside the slab and a larger and uniform refractive index inside the slab. If the electromagnetic radiation propagates from the wide end to the narrow end, a point is eventually reached at which the waveguide is sufficiently narrow so that at least one mode is no longer guided and radiates.

Attempts have been made to design waveguides having parameters chosen to minimize losses. See, for example, *Applied Optics*, 13, pp. 642-647, March 1974; *Applied Optics*, 16, pp. 711-716, March 1977; *Applied Optics*, 17, pp. 763-768, March 1978; *IEEE Journal of Quantum Electronics*, QE-11, pp. 75-83, February 1975; and *IEEE Journal of Quantum Electronics*, QE-18, pp. 1802-1806, October 1982.

SUMMARY OF THE INVENTION

We have found that radiation loss at bends or tapers of optical waveguides can be reduced and minimized by means of refractive index variation to essentially equalize optical path length. Such essential equalization is understood to be relative to optical path length along an optical axis of a waveguide, and equalization amounts to reducing or minimizing the difference between the optical path lengths along the optical axis and along other significant optical paths. (The latter are optical paths of the waveguide, defined conveniently to carry 75 percent of transmitted power, as well as, preferably, a significant neighborhood of the waveguide). Optical path length can be defined as the integral of refractive index as a function of geometrical path length, and comparison of optical path lengths is understood to involve lengths of paths originating at points on a phase front.

The waveguide has at least one section which is curved or whose cross-section varies, and the refractive index varies inside and preferably also in a vicinity of the waveguide so as to locally influence the direction of light propagation. In one embodiment, a waveguide is curved and the refractive index decreases as the distance from the center of the curvature increases. The radius of curvature may be as small as approximately 1 mm with a loss comparable to the loss within a straight waveguide section. In a particular embodiment, a plurality of dielectric prisms provides the varying refractive index which guides the beam around the curve. In yet another embodiment, the waveguides are tapered and have dielectric converging or diverging lenses to shape the wavefront and maintain the desired transverse field configuration. A diverging lens can be interpreted as formed by two prisms touching apex-to-apex, and a converging lens as formed by two prisms touching base-to-base.

For reasons of clarity, the elements depicted are not drawn to scale.

DETAILED DESCRIPTION

Curved and tapered waveguides according to our invention will be described generally and then more particular design considerations will be discussed.

Figure 1:
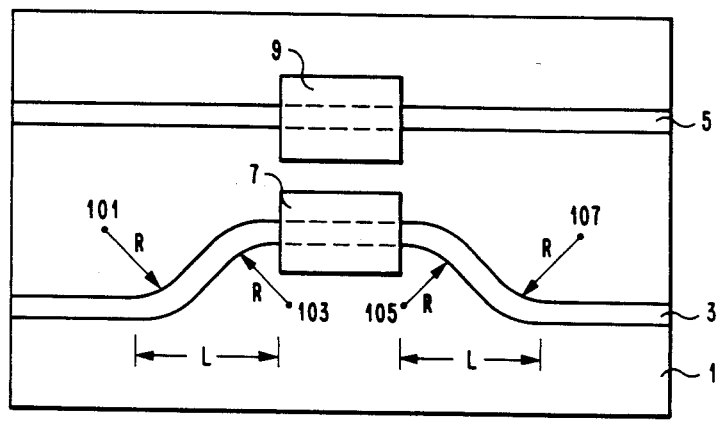
FIG. 1 is a schematic representation of a curved waveguide according to this invention.

FIG. 1 illustrates a curved waveguide according to this invention. Depicted are substrate 1, first waveguide 3, second waveguide 5, first electrode 7 to first waveguide 3 and second electrode 9 to second waveguide 5. Optical devices, not shown, may be connected to the ends of the waveguides. Application of suitable voltages to the electrodes permits optical signals to be transferred from one waveguide to the other. Techniques are well known to those skilled in the art and need not be described in more detail. As can be seen, waveguide 3 curves so as to come closer to waveguide 5 for energy transfer between the waveguides to occur and then curves again to move away from waveguide 5. Waveguide 3, has four curved or curvilinear sections, depicted as 101, 103, 105 and 107 which have radii of curvature indicated as R. Sections 101 and 103 have a combined length L as do sections 105 and 107.

Waveguide 3 has refractive index variations within each curved section which are chosen to permit the radius of curvature of the plurality of bends to be small while allowing the waveguide to guide the mode with little loss. The refractive index variations are such that the refractive index of the waveguide decreases as the distance from the center of curvature increases.

Figure 2:
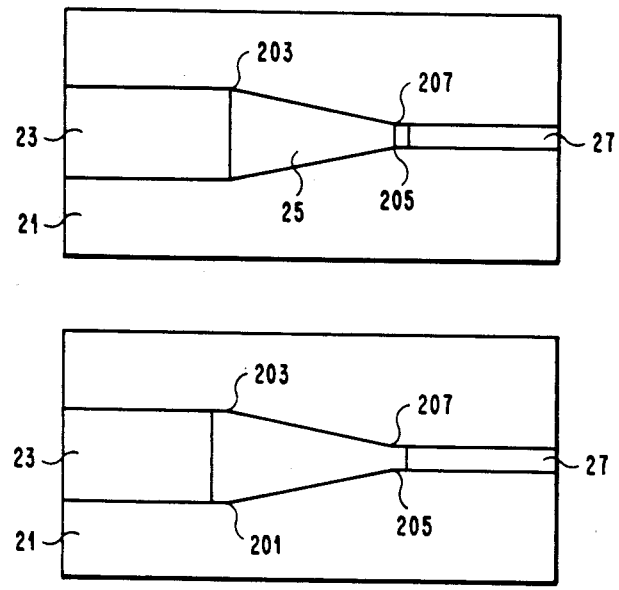
FIG. 2 is a schematic representation of a tapered waveguide according to this invention.

FIG. 2 depicts a tapered waveguide according to this invention. Depicted are substrate 21, first optical device 23, tapered dielectric waveguide 25, and second optical device 27. The first and second devices have different transverse dimensions, i.e., the optical energy is confined within regions of different transverse dimensions. Thus, the tapered dielectric waveguide connects the first and second optical devices which may be, for example, a light source such as a laser and an optical fiber. The tapers are formed by first polygonal sections 201 and 203 which form a converging section and second polygonal sections 205 and 207 which form a diverging section. The tapered waveguide is desirably used because the active area of the laser is typically smaller than the core region of the optical fiber and the taper permits more efficient light coupling between the two devices.

The tapered dielectric waveguide has a varying refractive index which influences the mode configuration within the waveguide as its transverse dimension varies and thus permits mode guidance with little radiative loss.

The device thus has a crosssectional profile of refractive index through and in the vicinity of the waveguide which can be represented as the sum of a first profile of refractive index and a second profile of refractive index. The first profile results in guidance of an electromagnetic wave at least in the absence of bends or tapers and the second profile is such as to essentially equalize optical path lengths aorund the bend or through a taper. Consequently, radiation loss at either the bend or the taper is minimized. Cross-sectional profile of refractive index means the variation of refractive index in the direction transverse to the longitudinal axis of the waveguide.

Figure 3:
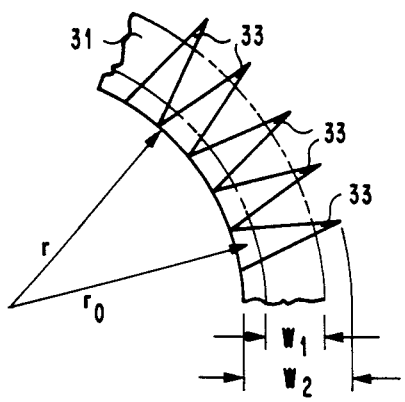
FIG. 3 is a detailed representation of a curved waveguide according to this invention.

FIG. 3 is a schematic representation of a portion of a curved waveguide section, for example, 101 and 103, according to our invention which is useful in illustrating how the desired refractive index variation is obtained in one exemplary embodiment. For reasons of clarity, the substrate is not depicted. Depicted are waveguide 31 and a plurality 33 of dielectric prisms. The waveguide ha a width $w_1$ while the height of each prism is $w_2$. The waveguide is at a distance $r_0$ from the center of the radius of curvature. The radial direction is indicated by the arrow designated $\underline{r}$. The prisms are positioned so that their widths decrease as the distance from the center of curvature increases. The refractive index of the waveguide decreases, on the average, as the distance from the concave interface increases.

For perfect steering of the beam, the following equation must be satisfied: $R_d = w_2 n/\Delta n$ where n is the refractive index of the waveguide and $\Delta n$ is the amount of refractive index increase due to the prisms.

This equation does not need to be satisfied exactly as the wedges will reduce the radiation lost due to bending. However, it should be at least approximately satisfied. For $\underline{r}$ much larger than $R_d$, the prisms are detrimental because of mode mismatch. For $\underline{r}$ much smaller than R, the prisms are less effective and there will be some loss due to radiation.

The waveguides are expediently fabricated using Ti-diffused $LiNbO_3$. In principle, the thickness of a Ti sheet deposited on a $LiNbO_3$ substrate and then diffused may be precisely controlled and the desired refractive index variation obtained by a single diffusion. However, this is not easy to accomplish in practice. It is presently easier in practice to deposit a layer of Ti with a uniform thickness through a mask having a crown-like shape. This layer is then diffused into the underlying $LiNbO_3$ substrate. A second Ti layer is then deposited and diffused to form the waveguide. While diffusion is considered to be particularly convenient for titanium and lithium niobate, other techniques such as, e.g., ion exchange or ion implantation may be used and indeed may be preferred under different circumstances.

Light within the waveguide travels from notch to notch of the crown parallel to the $\underline{y}$ axis. The separation between the notches is short as compared to the collimation length of guided beam, and the electromagnetic wave senses the average index and for all practical purposes, ignores the discontinuities.

Figure 4:
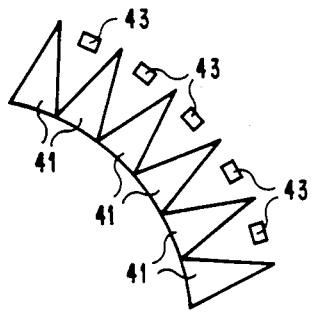
FIG. 4 is a schematic representation of another embodiment of a curved waveguide according to this invention.

While the embodiment depicted in FIG. 3 is expediently fabricated by using a dual-diffusion process with the prisms being formed by a first diffusion and the waveguide being formed by a second diffusion, embodiments are possible in which there is only a single diffusion. One such embodiment is depicted in FIG. 4 which comprises a plurality of prisms 41 and a plurality of waveguide segments 43. In this embodiment, the guiding of the beam around the turn is provided by the portions of the guides between the prisms.

Figure 5:
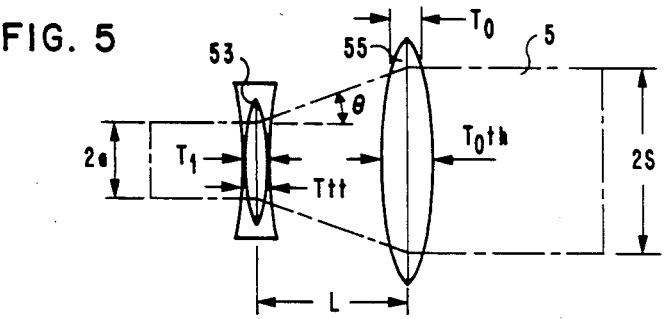
FIG. 5 is a schematic representation of a tapered waveguide according to this invention.

FIG. 5 depicts a tapered dielectric waveguide 5. The waveguide increases from a width $2a$ to a width $2b$. There is a diverging lens 53 and a converging lens 55 separated by a distance L. The lenses should overlap the waveguide so that they contain most of the decaying evanescent field. (Typically, the combined widths of index-modifying features is in the range from 1.1 to 4 and preferably from 1.5 to 3 times the width of the waveguide.) One skilled in the art can now show that optimum confinement is obtained when $t=n(b-a)a/(2 \Delta n L)$ and $h=n(b-a)b/(2 \Delta n L)$. A plurality of converging lenses and a plurality of diverging lenses can be used in place of depicted single lenses.

Figure 6:
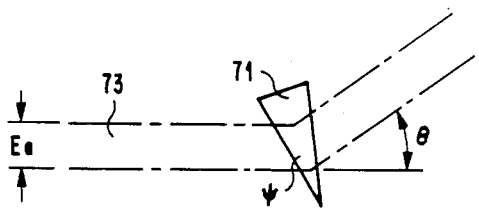
FIG. 6 is a schematic representation of a bent waveguide according to this invention.

Although the previous descriptions of curved waveguides were in terms of gradual changes in direction, it is contemplated that the change in direction of the curve of the waveguide may be abrupt. One such embodiment is depicted in FIG. 6 which uses only a single prism 71 to deflect the radiation in waveguide 73 through an angle $\theta$. Waveguide 73 has a width $2a$. One skilled in the art may show that optimum steering is obtained when $4\Delta n/n = \theta$.

It is believed that the desired refractive index and the prism shape and position variations may be more easily understood from the following explanation. To obtain the desired small radius of curvature, $w_2$ should be small and $\Delta n$ should be large. The fractional compensating index is limited by the materials available in the fabrication techniques. The choice of $w_2$, as well as the location of the crown notches with respect to the guide center, are design variables. Superficially, it seems that the distance between the base of the prism and the edge of the waveguide should be as small as possible. However, more careful consideration indicates that this is not an especially good choice. Due to the symmetry of the index distribution, the field configuration of the guided mode differs from that of the straight section and as a result, the conversion loss occurring at the junction of sections of guides with different curvatures such as an S-shaped guide depicted can become too large. There is a minimization of the total loss that occurs when the mode conversion loss at the junction and the radiation loss due to curvature are identical. Alternatively, loss can be minimized at the juncture of guide sections having different curvature by appropriate lateral displacement of one section relative to the other at the point of juncture.

Still further loss minimization is possible if the teeth of the crown are truncated. The losses are still smaller but problems arising from the high order modes may occur.

The field of applicability of the invention further includes ring lasers, channel dropping filters, frequency tuning, optical feedback circuits, pillbox resonators, and circular resonating cavities in communication, e.g., with a tangential waveguide. Furthermore, the invention is amenable to semiconductor implementation.

What is claimed is:

1. A device comprising, a substrate, an optical waveguide, said waveguide being in said substrate, said device having a cross-sectional profile of refractive index through and in the vicinity of said waveguide which can be represented as a sum of a first profile of refractive index and a second profile of refractive index, said first profile of refractive index being such as to result in guidance of an electromagnetic wave at least in the absence of bends or tapers, and said second profile of refractive index being such as to essentially equalize optical path length around a bend or through a taper, whereby radiation loss at said bend or taper is minimized.

2. Device of claim 1 in which said second profile of refractive index varies as a function of path length along said waveguide.

3. Device of claim 1 in which said second profile of refractive index results from at least one prism-shaped feature having raised refractive index.

4. Device of claim 3 in which said second profile of refractive index results from a plurality of prism-shaped features having raised refractive index.

5. Device of claim 4 in which said plurality of features is crown-shaped.

6. Device of claim 1 in which said second profile is non-zero over a domain which includes a significant portion of said substrate in at least one direction transverse to said optical path length.

7. Device of claim 6 in which a width of said domain is in the range of from 1.1 to 4 times a width of said waveguide.

8. Device of claim 7 in which a width of said domain is in a range of from 1.5 to 3 of a width of said waveguide.

9. Device of claim 1 in which said second profile of refractive index results from at least one lens-shaped feature having raised refractive index.

10. Device of claim 9 in which said lens-shaped feature has a divergent effect.

11. Device of claim 9 in which said lens-shaped feature has a convergent effect.

12. Method for making an optical device, said method comprising establishing a region of raised index of refraction in a body of optically transparent material, said region of raised index of refraction comprising a waveguide, said region of raised refractive index having a cross-sectional profile of refractive index which can be represented as a sum of a first profile of refractive index and a second profile of refractive index, said first profile of refractive index being such as to result in guidance of an electromagnetic wave at least in the absence of bends or tapers, and said second profile of refractive index being chosen so as to essentially equalize optical path lengths along the optical axis and other significant optical paths around a bend or through a taper, whereby radiation loss at said bend or taper is minimized.

13. Method of claim 12 in which said region is established by diffusion.

14. Method of claim 12 in which said region is established by ion implantation.

15. Method of claim 12 in which said region is established by ion exchange.

* * * * *